United States Patent [19]

Ishii et al.

[11] Patent Number: 5,012,414
[45] Date of Patent: Apr. 30, 1991

[54] VEHICLE CONTROL APPARATUS

[75] Inventors: Mitsuaki Ishii; Masaaki Miyazaki, both of Hyogo, Japan

[73] Assignee: Mitsubishi Denki K.K., Tokyo, Japan

[21] Appl. No.: 434,574

[22] Filed: Nov. 13, 1989

Related U.S. Application Data

[63] Continuation of Ser. No. 125,661, Nov. 25, 1987, abandoned.

[30] Foreign Application Priority Data

Nov. 25, 1986 [JP] Japan ................... 61-281201

[51] Int. Cl.⁵ .............................................. G06F 15/20
[52] U.S. Cl. ................... 364/424.03; 340/438
[58] Field of Search ............ 364/424.05, 424.03, 364/550, 551.01, 431.01; 371/8.1; 73/117.3; 340/438, 439

[56] References Cited

U.S. PATENT DOCUMENTS

| | | | |
|---|---|---|---|
| 4,234,921 | 11/1980 | Kinoshita et al. | 364/424 |
| 4,267,569 | 5/1981 | Baumann et al. | 364/431.01 |
| 4,375,672 | 3/1983 | Kato et al. | 364/424 |
| 4,497,057 | 1/1985 | Kato et al. | 340/52 F |
| 4,534,214 | 8/1985 | Takahashi | 73/117.3 |
| 4,584,487 | 4/1986 | Hesse et al. | 340/52 F |
| 4,615,321 | 10/1986 | Haefner et al. | 340/52 R |

OTHER PUBLICATIONS

Technique of Motor Vehicles; vol. 38, No. 2, 1984 (p. 158).

Primary Examiner—Gary Chin
Attorney, Agent, or Firm—Sughrue, Mion, Zinn Macpeak & Seas

[57] ABSTRACT

A vehicle control apparatus includes a condition detection device for detecting output information of at least one of the sensors having a predetermined condition which is improbable in practical use, a read only memory having data stored therein which identifies control specifications of the apparatus, and a data read out device for reading out the identifying data as a control signal for an object to be controlled.

6 Claims, 4 Drawing Sheets

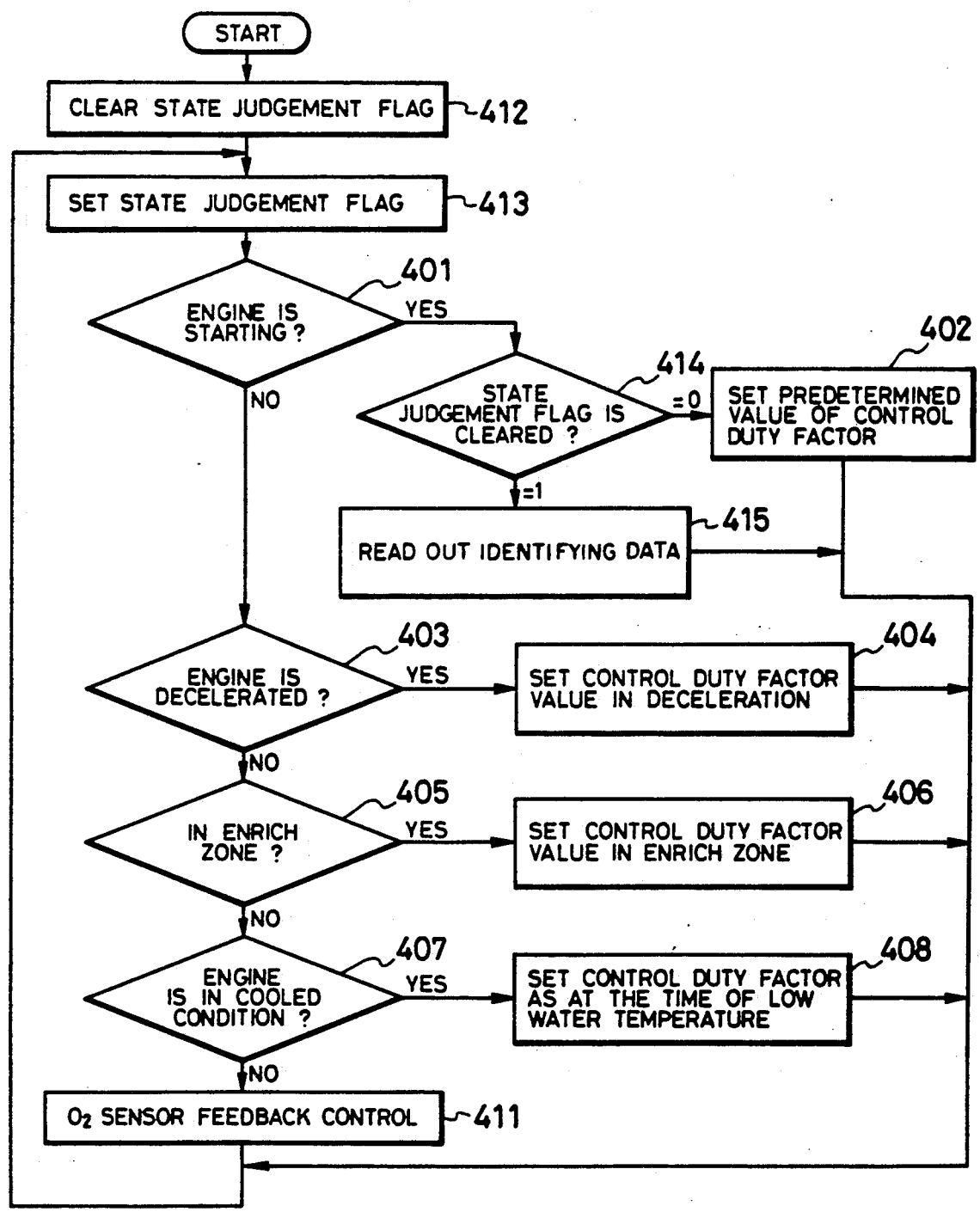

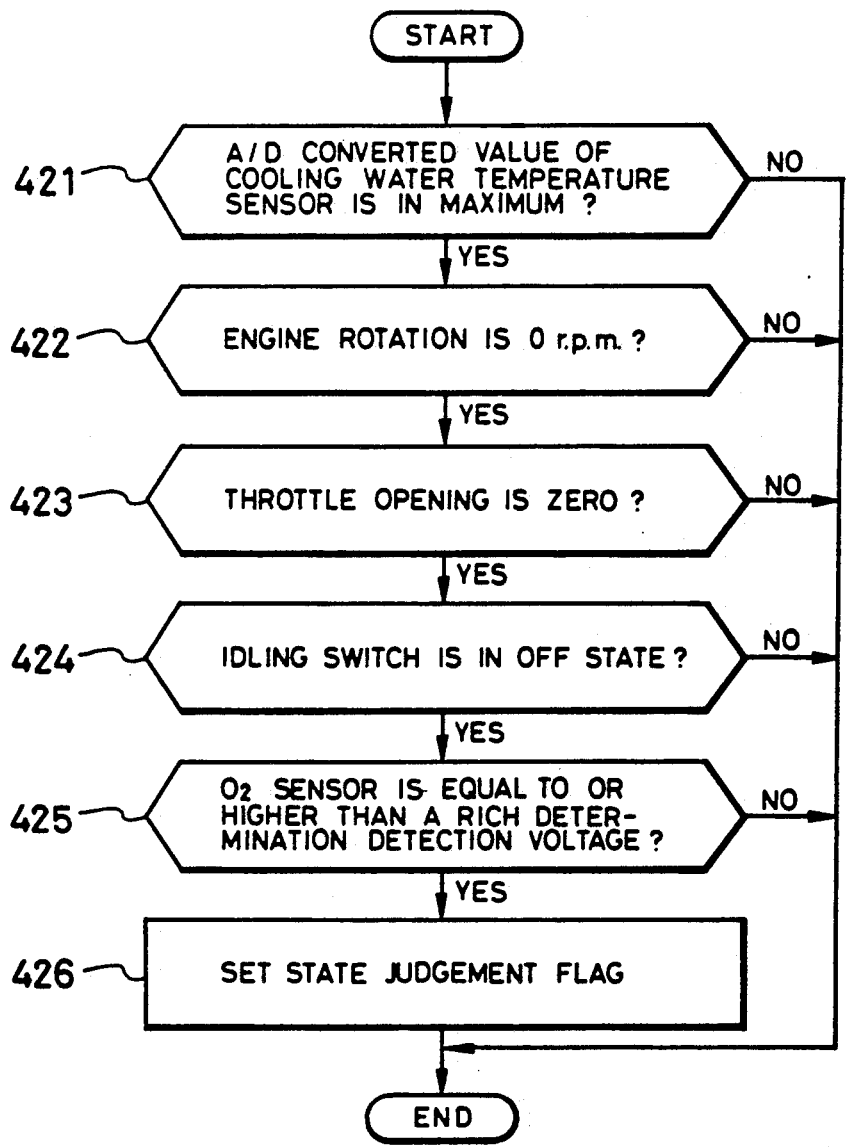

VEHICLE CONTROL APPARATUS

This is a Continuation of Application No. 07/125,661 filed Nov. 25, 1987 now abandoned.

BACKGROUND OF THE INVENTION

The present invention generally relates to a vehicle control apparatus, and more particularly, relates to a vehicle control apparatus in which when the control apparatus is tested, it can be confirmed whether or not the output signals are produced correctly in accordance with the input signals, and the control specifications for the particular control apparatus can be checked in a short time.

Recently, a variety of vehicle control apparatuses using microcomputers have come to be used. For example, as an example of such a vehicle control apparatus, an engine air-fuel ratio control apparatus comprising blocks of a CPU (central processing unit), a RAM (random access memory), a ROM, an A/D (analogue-to-digital) converter, an I/O (input/output) unit, etc. is disclosed in "Automobile Technology" Vol. 38, No. 2, 1984, page 158.

A variety of control specifications are required for such engine control apparatuses in accordance with the kind of vehicle, the kind of engine capacity, the kind of transmission, and so on, and there has been a demand for various kinds of engine control apparatuses which can satisfy various requirements.

The demand can be satisfied by changing the procedures or control specifications stored in a ROM provided in the engine control apparatus without changing the circuit arrangement of the engine control apparatus. Accordingly, standardization of the engine control apparatus can be effected and low cost can be expected by mass production.

When the thus arranged control apparatus is tested individually or as a unit, it is necessary to test the control apparatus to determine whether or not the control apparatus can function correctly from the outside thereof through terminals of the control apparatus.

For example, in some cases, the test can be made only through a connector to which an outside connector can be connected from the outside of the apparatus, after a control circuit printed on a substrate has been received in a housing and the parts number for identification has been indicated on the housing.

In such cases, in order to determine the control specifications stored in a ROM in the control apparatus, it is necessary to make a judgment on the basis of an externally inspected difference in operation as a difference in control specification. In order to identify the king of control apparatus (i.e., the kind or type of control specifications stored therein) among a variety of control apparatuses in which the respective control specifications are varied from one another in control data, however, there have often been difficulties in execution of the test correctly. For example, the method of test has been complicated, and a prohibitive amount of time has been taken for the test, etc.

In those cases, however, there is a case where ROMs, storing the control specifications, which have been subject to unit test in advance are used in the control apparatuses and the operation of various input/output terminals of the control apparatuses can be tested in a short time regardless of the partial variations in control specifications, and therefore a difficulty results in only distinguishing the partial variations in control specifications.

For example, in a case where the stored control specifications are only in the point that the two kinds of control apparatuses have time data of 10 minutes and 20 minutes respectively, there has been a problem in that it is impossible to distinguish the two control apparatuses unless one of the control apparatuses is caused to operate for at least 10 minutes. Thus, it takes a very long time to execute the test. This difficulty has been a serious problem in mass-production of control apparatuses.

SUMMARY OF THE INVENTION

It is therefore an object of the present invention to solve the problems associated with the conventional apparatus.

It is another object of the present invention to provide a control apparatus for a vehicle which is high in quality and in which not only can it be confirmed that the output signals are produced correctly, but also one can check in a short time whether the proper control specifications are being employed.

In order to attain the above objects, according to the present invention, the vehicle control apparatus comprises a condition detection means for detecting an output information of at least one of the sensors having a condition which is improbable in practical use and which is a predetermined one, a read only memory having data stored therein which identifies the type or class of control specifications stored in the apparatus, and a data read out means for reading out the identifying data as a control signal for a control object.

In the thus arranged control apparatus, when the condition which is improbable in practical use and which is a predetermined one is detected by the condition detection means, the data identifying the control specifications is put out as a controlled variable or control signal for the object to be controlled, and in test, a signal having the condition which is improbable in practical use and which is a predetermined one is applied to the sensors so as to read out the identifying data as the control signal to thereby distinguish the kind of control apparatuses (i.e., distinguish the control specifications of the control apparatus).

BRIEF DESCRIPTION OF THE DRAWINGS

FIGS. 3 and 4 are flowcharts for explaining the operation of the embodiment of FIG. 2.

DETAILED DESCRIPTION OF THE PREFERRED EMBODIMENT

Figure 1:
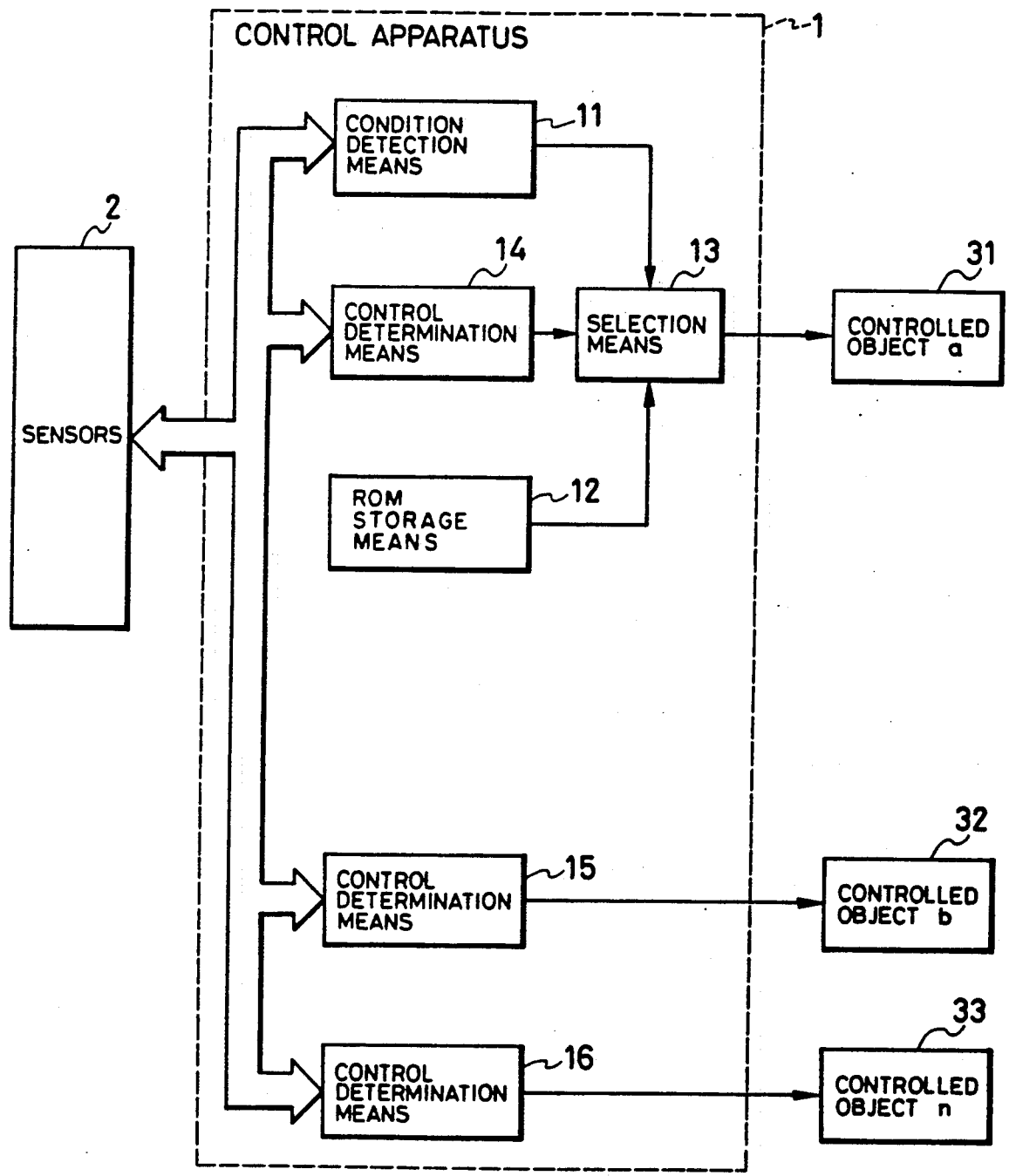
FIG. 1 is a functional block diagram showing an embodiment of the vehicle control apparatus according to the present invention.

Referring to the drawings, an embodiment of the vehicle control apparatus according to the present invention will be described hereunder in detail. FIG. 1 is a functional block diagram showing the embodiment. In FIG. 1, a control apparatus employing a microcomputer is connected to a plurality of sensors 2 for detecting the conditions at various parts of a vehicle, respectively, and objects 31 through 33 are controlled by the control apparatus 1.

The control apparatus 1 has a condition detection means 11, a storage means 12, a selection means 13, and control determination means 14–16. The condition detection means 11, a selection means 13, and the control determination means 14-16 are arranged so as to carry out data transfer with the sensors 2.

The control determination means 15 and 16 are arranged to process and determine the contents of control for the controlled objects 32 and 33 on the basis of the output signal of the sensors 2 in accordance with a predetermined procedure (i.e., predetermined control specifications). The condition detection means 1 1 is arranged to detect the fact that any of the sensors 2 produces an output signal which has a predetermined condition which is improbable in a practical case.

The storage means 12 is arranged to read out control specification identification data as a control signal for the controlled object 31, and the control determination means 14 is arranged to determine the control signal that is required for the controlled object 31 in practical use.

The selection means 13 is arranged to be responsive to the output signal of the condition detection means 11 to apply a selected one of the respective outputs of the control determination means 14 and the storage means 12 as a control signal for the controlled object 31.

In FIG. 1, when the condition detection means 11 detects the fact that an output signal from any of the sensors 2 is the predetermined condition which is improbable in practical use, the identification data of the storage means 12 is applied as a control signal for the controlled object 31 through the section means 13. Accordingly, when the control apparatus 1 is subject to unit test, a predetermined signal improbable in practical use is applied to each input terminal instead of an output of each sensor 2, and the control signal for the controlled object 31 is measured, so that the control specifications stored in the control determination means 14-16 can be distinguished easily in a short time.

Figure 2:
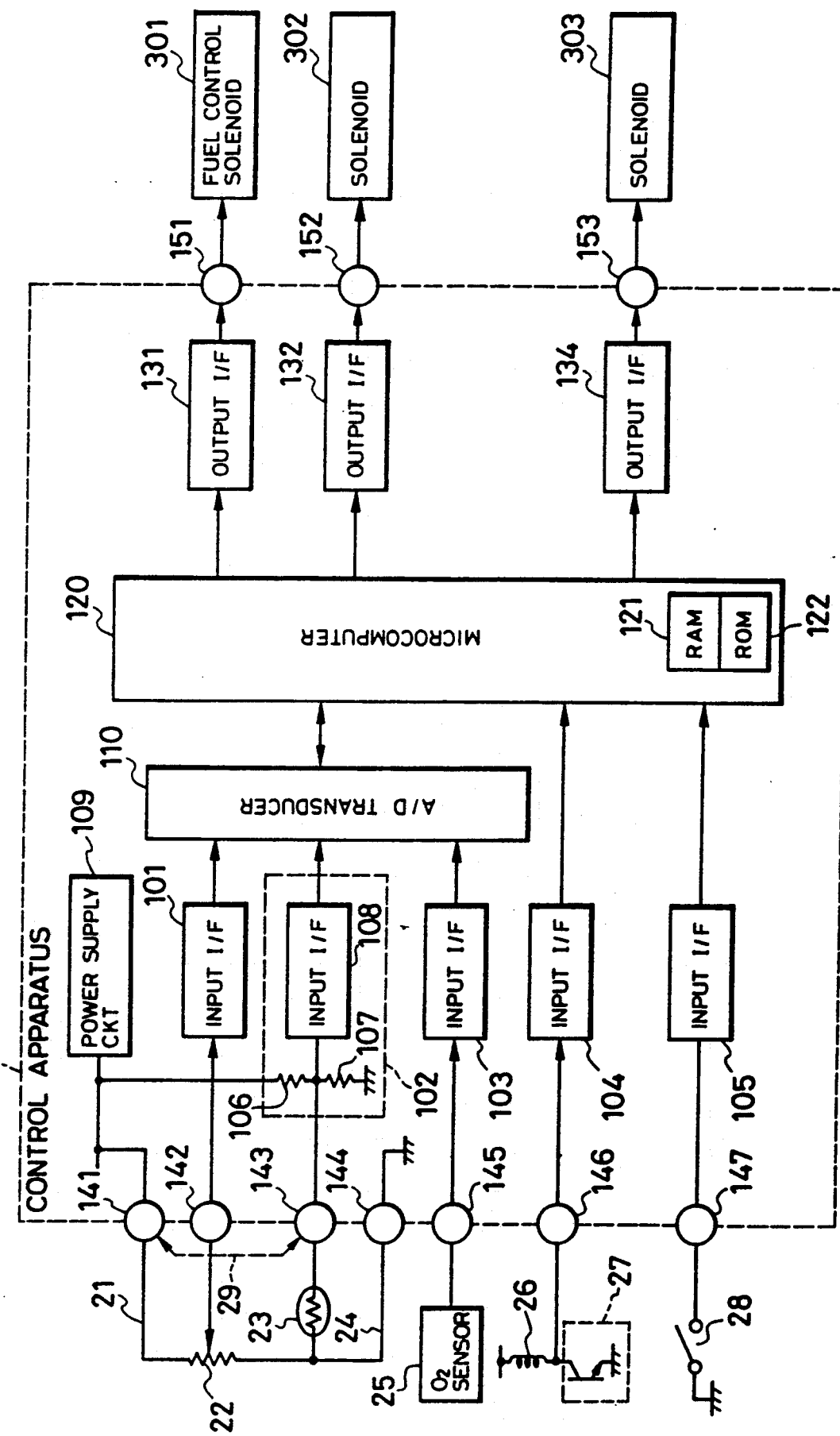
FIG. 2 is a block diagram showing a specific construction of the vehicle control apparatus of FIG. 1.

FIG. 2 is a block diagram showing a specific embodiment of the present invention. The drawing shows a whole arrangement of the air-fuel ratio control system. A control apparatus 1 has terminals 141 through 147, and 151 through 153. An output terminal of a power supply circuit 109 is connected to the terminal 141, and a power supply line 21 for energizing sensors, a throttle opening sensor 22 and a sensor earth line 24 are connected in series between the terminals 141 and 144.

A cooling water temperature sensor 23 is connected between the sensor earth line 24 and the terminal 143, and the movable arm of the throttle opening sensor 22 is connected to the terminal 142. The throttle opening sensor 22 is constituted by a potentiometer for converting a throttle opening into a voltage signal, and the cooling water temperature sensor 23 is constituted by a thermistor for detecting a temperature of cooling water.

An $O_2$ sensor 25 for detecting the density of oxygen in an exhaust gas is connected to the terminal 145, an ignition coil 26 and an igniter 27 for controlling the ignition coil 26 are connected in series between a power source and the earth and the junction point therebetween is connected to the terminal 146, and an idle switch 28 for detecting whether or not the throttle is in the depressed condition is connected to the terminal 147.

The power supply circuit 109 is provided for supplying electric power to the throttle opening sensor 22 and parts inside the control apparatus, and the output terminal of the power supply circuit 109 is connected to the earth through resistors 106 and 107. The resistors 106 and 107 form a resistor network together with the cooling water temperature sensor 23 so as to convert the temperature of cooling water into a voltage signal.

The terminals 142, 143, 145-147 are connected to the respective input terminals of input interfaces (hereinafter referred to as input I/Fs) 101, 108, 103105. The input I/Fs 108 and the resistors 106, 107 constitute an input I/Fs 102.

Each of the input I/Fs 101, 103 through 105, and 108 is constituted by a filter circuit or the like for eliminating noise components. The respective outputs of the input I/Fs 101, 108 and 103 are applied to an A/D converter 110.

The A/D transducer 110 is arranged to convert the respective output voltage signals from the input I/Fs 101, 103 and 108 into digital signals which are applied to a microcomputer 120. The microcomputer 120 is provided with a RAM 121 and a ROM 122 therein, and the respective outputs of the input I/Fs 104 and 105 are applied to the microcomputer 120. The output of the microcomputer 120 is applied to a fuel control solenoid 301 through an output interface circuit (hereinafter referred to as output I/F) 131 and the terminal 151 after amplified by the output I/F 131, to a solenoid 302 through an output I/F 132 and the terminal 152 after amplified by the output I/F 132, and to a solenoid 303 through an output I/F 134 and the terminal 153 after amplified by the output I/F 134.

The fuel control solenoid 301 is incorporated in a corroborator of the engine, and is subject to duty-factor control so as to control the air-fuel ratio in accordance with the amount of the controlled value of the duty factor. The solenoid 302 and 303 are provided to control an exhaust gas.

Next, the operation of the control apparatus 1 shown in FIG. 2 will be described. The A/D converter 110 receives the respective outputs of the throttle opening sensor 22, the cooling water temperature sensor 23, and the $O_2$ sensor 25 through the respective input I/Fs 101, 108, and 103 so as to convert them into digital signals respectively. The microcomputer 120 receives those digital signals from the A/D converter 110 so as to read the input information from the respective sensors.

The microcomputer 120 receives an intermittent signal from the ignition coil 26 through the terminal 146 and the input I/F 104 so as to measure the time of ignition interval. The microcomputer 120 converts the measured time of ignition interval into the rotational speed of the engine so that the thus measured rotational speed is utilized for various control.

The microcomputer 120 receives a signal from the idling switch 28 through the terminal 147 and the input I/F 105 so as to judge where the idling switch 28 is in an OFF state or in an ON state on the basis of the input signal.

On the basis of those input information, the microcomputer 120 determines the control logic for the fuel control solenoid 301, and the solenoids 302 and 303 in accordance with the procedure stored in the ROM 122.

The solenoids 302 and 303 are arranged so as to be turned off when the rotational speed of the engine exceeds a predetermined value, and the fuel control solenoid 301 is arranged so as to be controlled in accordance with the flowchart of FIG. 3.

In FIG. 3, in the step 412, a state judgment flag which is used later in the step 414 is cleared upon turning-on of power supply of the control apparatus 1.

In the step 413, the state judgment flag is set when an output signal of any of the sensors shows the condition improbable in a vehicle in practical use.

The detail of the step 413 is described by using FIG. 4. It is assumed that the terminals 141 and 143 are short-circuited temporarily as indicated by a broken line 29 in FIG. 2 when the control apparatus 1 is subject to unit test.

The voltage applied to the terminal 143 is normally obtained by dividing the senor power supply voltage through the resistors 106 and 107, and the cooling water temperature sensor 23. Accordingly, the voltage at the terminal 143 normally exhibits a lower value than the sensor power supply voltage. If the terminals 141 and 143 are short-circuited as described above, the voltage at the terminal 143 becomes equal to the sensor power supply voltage, the voltage being a value improbable in practical use.

In FIG. 4, in the step 421, the A/D converted value of the cooling water temperature sensor 23 is determined by the voltage division through the resistors 106 and 107 when terminals 141 and 143 are not short-circuited, and this value does not become maximum even when the connection to the cooling water temperature sensor 23 is opened. Although the operation is shifted to the step only when the A/D converted value of the cooling water temperature sensor 23 becomes maximum, that is, become equal to the sensor power supply voltage, the operation does not pass through the state judgment flag set processing in the step 426 unless the A/D converted value of the cooling water temperature sensor 23 becomes maximum.

Similarly to this, thereafter, only when a combination of the sensors improbable in practical use is established in each of the following steps, the state judgment flag is set in the step 426 so as to eliminate misjudgment.

Specifically, the state judgment flag is set in the step 426 only when all the conditions in the steps 422 through 425 are satisfied, that is, only when the engine rotational speed is 0 r.p.m. in the step 422, the throttle is fully opened, that is, the A/D converted value of the throttle opening is zero the step 423, the accelerator is in the depressed state, that is, the idling switch is in the OFF-state, in the step 424, and the output signal of the O₂ sensor 25 is equal to or higher than a rich determination detection voltage in step 425.

When the control apparatus 1 is subject to unit test, it is possible to apply a signal to each of the terminals 141 through 147 independently of each other, and therefore it is easy to apply input information improbable in practical use to the terminals so as to establish all the conditions shown in FIG. 4.

Assuming now that input information is applied to the input terminals immediately after the start of test of the control apparatus 1 so that all the conditions in the steps 421-425 as shown in FIG. 4 are temporarily satisfied. As a result, the state judgment flag is set in test.

In FIG. 3, in the step 401, it is determined that the engine is in the state of cranking (starting) when the rotational speed of the engine is not higher than 400 r.p.m. If it is proved that the state judgment flag is in the cleared state in the step 414, a predetermined value of control duty factor at the time of starting is put out as a controlled variable in starting, in the step 402.

The microcomputer 120 converts the duty factor value, which is a controlled variable at the time interruption processing, so as to control the duty factor of the fuel control solenoid 301.

Similarly to this, every time the control duty factor value for the fuel control solenoid 301 is set, the control duty factor value is converted into a pulse signal through time interruption processing. The process of the conversion of the duty factor value into a pulse signal is omitted here.

In the step 414, if it is judged that the state judgment flag is set, the control specification identifying data stored in the ROM 122 is read out in the step 415, and the data is set as a value of the control duty factor for the fuel control solenoid 301.

When the rotational speed of the engine exceeds 400 r.p.m. in the step 401, the operations shifted to the step 403. In the step 403, judgment is made as to whether or not the engine is being decelerated on the basis of the engine rotational speed and the information of the idling switch 28. If the judgment proves that the engine is in the decelerating state in the step 403, a control duty factor value in deceleration is set as a controlled variable in deceleration in the step 404.

In the step 405, judgment is made as to whether or not the control is in the enrich zone on the basis of the engine rotational speed and the information of the throttle opening sensor 22. If the judgment proves that the control is in the enrich zone in the step 405, a control duty factor value in the enrich zone is set as a controlled variable in the enrich zone the step 406.

In the step 407, judgment is made as to whether or not the engine is in the cooled condition, that is, whether or not the temperature of the cooling water control is low on the basis of the information from the cooling water temperature sensor 23. If the judgment proves that the cooling water temperature is low in the step 407, operation is shifted to the step 408, in which a value of the control duty factor is set as a controlled variable at the time of low water temperature.

If the judgment proves that the engine is in the warning-up state in the step 407, operation is shifted to the step 411 in which the air-fuel ratio feedback control by the Oz sensor 25 is carried out to determine the control duty factor value by the generally known proportional-plus-integral control so as to make the air-fuel ratio be a theoretical air-fuel ratio.

In the aforementioned explanation, the control specification identifying data is put out as a duty-factor value in a case where an object to be controlled is controlled with its duty factor. However, the invention is not limited to this, but is applicable in a case where the control specification identifying data is put out as a pulse duration.

According to the present invention, as described above, the control apparatus is arranged in a manner so that when the input information from any of the sensors has a predetermined condition which is improbable in practical use, control specification identifying data can be read out and put out as in the form of a pulse signal width. Accordingly, not only can it be confirmed whether or not the output signals are produced correctly in accordance with the input signals, but whether or not the control specification is proper for the vehicle can be checked in a short time. Accordingly, the control apparatus can be produced with high quality.

In conclusion, the invention relates to an apparatus for controlling a vehicle including sensors 2 for sensing conditions at various parts of the vehicle, and for outputting information in accordance with the sensed conditions; one or more objects 31-33 which is/are to be controlled; a control determination means 14-16, coupled to the sensors 2, for storing predetermined control specifications, and for generating a first control signal for the object(s) according to the output information from the sensors 2 and the stored predetermined control specifications; condition detection means 11, coupled to the sensors 2, for detecting output information therefrom, and for outputting a predetermined control signal when the detected output information from the sensors 2 represents a condition which is improbable in practical use; and storage means 12 for storing identifying data which corresponds to the stored predetermined control specification. The storage means 12 includes means for reading out the stored identifying data as a second control signal.

The apparatus further includes selection means 13 for selectively applying either the first or the second control signal to the object(s). An operator can ascertain the stored predetermined control specifications by simply applying the predetermined condition which is improbable in practical use, and then observing the operation of the object(s) which will be controlled by the second control signal.

What is claimed is:

1. An apparatus for controlling a vehicle comprising:
    sensor means (2) for sensing conditions at various parts of the vehicle, and for outputting information in accordance with the sensed conditions;
    an object (31–33) which is to be controlled;
    control determination means (14–16), coupled to said sensor means, for storing predetermined control specifications, and for generating a first control signal for said object in accordance with the output information from said sensors means and said stored predetermined control specifications;
    condition detection means (11), coupled to said sensors, for detecting output information therefrom, and for outputting a predetermined control signal when the detected output information from said sensor means represents a predetermined sensed condition which is improbable in practical use;
    storage means (12) for storing identifying data which corresponds to the predetermined control specifications stored in said control determination means, said storage means including means for reading out said stored identifying data as a second control signal for said object; and
    selection means (13), in response to said condition detection means, for selectively applying one of said first and second control signals to said object, whereby an operator who applies the predetermined condition which is improbable in practical use can ascertain the predetermined control specifications stored in said control determination means by observing the operation of said object which will be controlled by said second control signal.

2. The apparatus as defined in claim 1, wherein said selection means is connected to receive an output from said condition detection means, and wherein said selection means applies the second control signal to said object in response to said predetermined control signal.

3. The apparatus as defined in claim 1, wherein said sensor means comprises a plurality of sensors.

4. The apparatus as defined in claim 1, wherein said control determination means is a ROM.

5. The apparatus as defined in claim 1, wherein there are a plurality of objects to be controlled, and wherein there are a plurality of control determination means for the plurality of objects, respectively.

6. The apparatus as defined in claim 1, wherein said second control signal is a duty-factor control signal.

* * * * *